United States Patent [19]
Weed

[11] Patent Number: 6,038,025
[45] Date of Patent: Mar. 14, 2000

[54] METHOD FOR MANUFACTURING OF FIBEROPTIC GYROSCOPE BY PROVIDING A FLEXIBLE CONNECTOR CONNECTED TO THE COIL AND REMAINING GYROSCOPE ELEMENTS

[75] Inventor: George A. Weed, Phoenix, Ariz.

[73] Assignee: Honeywell Inc., Minneapolis, Minn.

[21] Appl. No.: 09/058,627

[22] Filed: Apr. 9, 1998

[51] Int. Cl.[7] ................................................. G01C 19/72
[52] U.S. Cl. ............................................................ 356/350
[58] Field of Search ............................................. 356/350

[56] References Cited

U.S. PATENT DOCUMENTS

| | | | |
|---|---|---|---|
| 4,712,306 | 12/1987 | Cahill et al. | 356/350 |
| 4,717,256 | 1/1988 | Ensley et al. | 356/350 |
| 5,085,501 | 2/1992 | Sakuma et al. | 356/350 |
| 5,194,917 | 3/1993 | Regener | 356/350 |
| 5,294,972 | 3/1994 | Kemmler | 356/350 |
| 5,357,339 | 10/1994 | Teraoka et al. | 356/350 |
| 5,481,358 | 1/1996 | Dyott et al. | 356/350 |

OTHER PUBLICATIONS

Fiber Optic Sensors, chapter 11, edited by Udd, pp 355–384, 1994.

Bramson, Michael "The depolarized fiber–optic gyro for future tactical applications" SPEI vol. 1367 Fiber Optic and Laser Sensors VIII, pp. 155–160 (1990).

*Primary Examiner*—Samuel A. Turner
*Attorney, Agent, or Firm*—Albert K. Kau

[57] ABSTRACT

A method for fabricating a fiberoptic gyroscope and the fiberoptic gyroscope produced thereby are disclosed. The method and apparatus are characterized in that optical coils are connected to a substantially rigid member through flexible connectors, thereby enabling a modular unit with increased mobility and accessibility. Multiple assemblies may be arranged to enable the formation of multi-axis fiberoptic rotation rate sensors.

8 Claims, 8 Drawing Sheets

METHOD FOR MANUFACTURING OF FIBEROPTIC GYROSCOPE BY PROVIDING A FLEXIBLE CONNECTOR CONNECTED TO THE COIL AND REMAINING GYROSCOPE ELEMENTS

TECHNICAL FIELD OF THE INVENTION

The present invention relates, generally, to fiberoptic gyroscopes used for rotation sensing and, more particularly, to a method and apparatus for manufacturing fiberoptic gyroscopes in a cost-effective manner.

BACKGROUND OF THE INVENTION

Fiberoptic gyroscopes are well known in the art and are generally an attractive means for sensing rotation, as they can be made quite small and still be constructed to withstand considerable mechanical shock, temperature change, and other environmental extremes. While there are various forms of optical sensors which utilize the well known Sagnac effect to detect rotation about appurtenant axis of the device, typical fiberoptic gyroscopes employ a single optical fiber of substantial length which is formed into a coil by being wound on a core or bobbin to form a closed optical path. An electromagnetic wave, typically generated by a light source, is introduced and split into two light beams to propagate in opposite directions through the coil. The waves ultimately are caused to interact with a photo detector. The path length differences between the pair of electromagnetic waves during angular rotation introduces a phase shift between those waves so that the output signal depends on the length of the entire optical path through the coil traversed by the two opposing directional electromagnetic waves.

Figure 1:
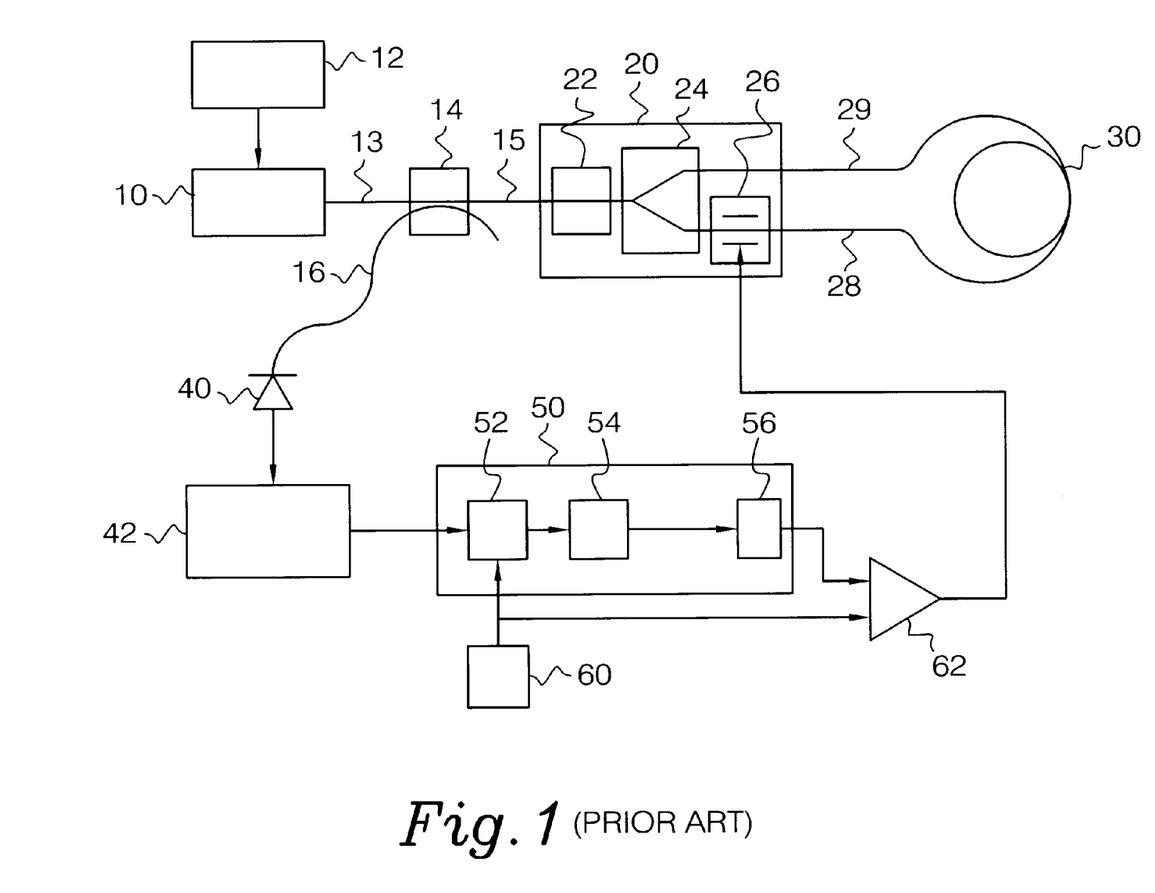
FIG. 1 is a block diagram of a prior art fiberoptic gyroscope.

An exemplary block diagram of a typical fiberoptic gyroscope is shown in FIG. 1. As shown the fiberoptic gyroscope includes a light source 10, a detector 40, an optical fiber coil 30, a modulator 26, a coupler 14, a polarizer 22, and an integrated optics chip 20. As is known, when an electromagnetic wave is emitted from source 10, it passes through coupler 14, is appropriately polarized by polarizer 22, and thereafter split by optical splitter 24 into two beams. Each beam is conducted along two optical paths, one through optical cable 28 and one through optical cable 29. Each of the beams propagate through coil 30 (one being a clockwise beam and the other a counterclockwise beam). The rotation of coil 30 causes a phase difference between the beams, and the amount of rotation can be obtained by detecting the phase difference. Modulator 26 is utilized, as is known, to realize a desired sensitivity. Detector 40 is utilized to detect the intensity of the interference beam thus obtained, the intensity of the interference beam is converted into an error signal used to provide loop closure in the signal processing circuit mounted on board 50.

Such fiberoptic gyroscope constructions are typically formed in various sizes and configurations. Orientation of multiple fiberoptic gyroscope of the type shown in FIG. 1, such as by appropriately orienting three single axis fiberoptic gyroscopes in a suitable fashion, the size of the system becomes large, unwieldy, and complex to manufacture. Alternatives to such oversized configurations are known.

Various attempts to design and develop a compact, easy to manufacture fiberoptic gyroscope have been attempted. For example, a depolarized fiberoptic gyroscope based inertial measurement unit disclosed by the Naval Weapons Center in an article entitled "The Depolarized Fiber-Optic Gyro for Future Tactical Applications," published in SPIE Volume 1367 Fiberoptic and Laser Sensors VIII (1990), p. 155 et seq., discloses a compact three-axis fiberoptic gyroscope concept in which three fiberoptic coils pick up each of the three orthogonal axis of rotation. Associated drive electronics for proper operation of each of the three gyro axis are disclosed as likely being contained within the package (see FIG. 9).

In U.S. Pat. No. 4,717,256 issued Jan. 5, 1988, to Ensley, et al., and assigned to the U.S.A. as represented by the Secretary of the Navy, a fiberoptic rate sensor is disclosed. In accordance with one embodiment, single-axis and three-axis packages comprising compact units are shown. (See FIGS. 11 and 12.) In these embodiments, the glass fiber is wound around a metal frame to form a coil with the other elements of the sensor mounted within the frame.

Similarly, U.S. Pat. No. 5,357,339 issued Oct. 18, 1994, to Teraoka, et al., and assigned to Hitachi Cable Ltd., relates to a multi-axis fiberoptic gyroscope assembly. The '339 patent discloses individual fiberoptic gyroscope units shaped like tetragonal cones, which are mounted to a square plate used as a base to hold the light source, detector, and coil. The single-axis gyroscope unit disclosed therein occupies a unit shape comprising a tetragonal pyramid. Ostensibly, a plurality of identical one-axis gyroscope units can be combined to form a three-axis fiberoptic gyroscope.

Various multi-axis fiberoptic gyroscope assemblies in which the plural fiber coils share common electric components are also known. For example, U.S. Pat. No. 5,194,917 issued Mar. 16, 1993, to Regener and assigned to Standard Elektrik Lorenze Aktiengesellschaft, discloses a fiberoptic gyroscope integrated on a silicon substrate, U.S. Pat. No. 5,294,972 issued Mar. 15, 1994, to Kemmler and assigned to Lite GmbH discloses a multi-axis fiberoptic rotation rate sensor with parallel sensing coils, and finally, U.S. Pat. No. 5,085,501 issued Feb. 4, 1992, to Sakuma, et al., and assigned to Japan Aviation Electronics Industry Ltd., discloses a fiberoptic gyroscope using optical wave guide couplers. In the '501 patent, the optical integrated circuit substrate is fixed to a reinforcing plate, which in turn is held on a support structure by flexible holding means.

Each of these attempts, however, while providing some modicum of ease of manufacture, does not fully address the need, which is long felt, for a fiberoptic gyroscope design which is versatile and easy to manufacture. In general, while prior attempts have been made to devise and design a low cost manufacturing approach for fiberoptic gyroscopes the currently available prior art does not adequately meet this need.

SUMMARY OF THE INVENTION

In accordance with various aspects of the present invention, the foregoing disadvantages of the prior art are addressed. While the way in which the present invention accomplishes the objective will be described in greater detail herein below, in general, a method and apparatus for constructing a fiberoptic gyroscope in accordance with the present invention involves the step of utilizing flexible substrate to contain and connect the majority of the fiberoptic gyroscope components. For example, the entire closed loop fiberoptic gyroscope is assembled on a compact carrier, such as a printed wiring board and flexible circuit assembly, such that the assemblies are easily manufactured. Moreover, multiple assemblies can be attached to a suitable housing to enable assembly of rate sensors suitable for measurement of rotational angular velocity about two, three or more axis.

A system according to various aspects of the present invention includes the advantages of greater versatility, low-cost manufacturing, and enhanced rework or replacement of portions of an assembly or the entire assembly itself. Because the device is assembled in accordance with the present invention can be easily manufactured, the cost associated with automating the techniques are minimized. These and other advantages of the present invention will be apparent to those skilled in the art upon reading and understanding the following detailed description with reference to the accompanied drawing figures.

BRIEF DESCRIPTION OF THE DRAWING FIGURES

Preferred exemplary embodiments of the present invention will hereinafter be described in conjunction with the appended drawing figures, wherein like numerals denote like elements and.

DETAILED DESCRIPTION OF THE PREFERRED EXEMPLARY EMBODIMENTS

Referring now to FIG. 1. A typical construction of a prior art fiberoptics gyroscope is disclosed. A light source 10 provides electromagnetic wave energy by means of a fiberoptic cable 13 to a directional coupler 14. The directional coupler 14 interconnects the light from the light source through an optical cable 15 to an integrated optics chip 20. It also splits the light that is returning along fiberoptic cable 15 and transmits a portion of this light along fiberoptic cable 16 to a photodetector 40 as will be explained later. In the typical integrated optics chip 20 is a polarizer 22 and a beam splitter 24. The beam splitter splits the incoming light along two paths. One of which allows the light to rotate clockwise through fiberoptic cable 29 around the fiberoptic cable 30 while the other leg allows the light to pass through a modulator 26 and rotate counter-clockwise along fiberoptic cable 28 around coil 30. A temperature and current control circuit 12 drives the light source 10.

As is known in the art the modulator 26 can be on a single leg of the fiberoptic cable or on both legs and can have a separate modulation circuit for each leg. The photodetector 40 converts the electromagnetic light energy into electrical energy, which is transmitted to a preamplifier 42. This preamplifier 42 feeds its signal into a signal processor 50. Typically a signal processor 50 consists of a demodulator 52; and loop closure electronics 54 which is then fed to a digital ramp generator 56. A bias modulator 60 also feeds a signal into demodulator 52 and simultaneously feeds the signal to a summing device 62. The output of the digital ramp generator is also fed to the summer 62, which then feeds its signal into the modulator 26.

As can be seen from this simple example of a prior art fiberoptics gyro, there are multiple fiberoptic cable interconnection between the optical components and a multitude of electrical connectors throughout the circuitry. The fact that we have multiple electrical connections and multiple optical connections makes assembly of a typical fiberoptics gyroscope very difficult. Each one of the fiberoptics connectors may need to be spliced one to the other or spliced at its mid-point in order to effect assembly. Furthermore, the fiberoptic coil 30 usually has rather lengthy leads 28 and 29 to the integrated optics chip 20. Assembly would require that the handling of these interconnections, especially the optical interconnections, be very careful to prevent damage to the outside shielding or kinking or breaking of the optical cable.

Figure 2:
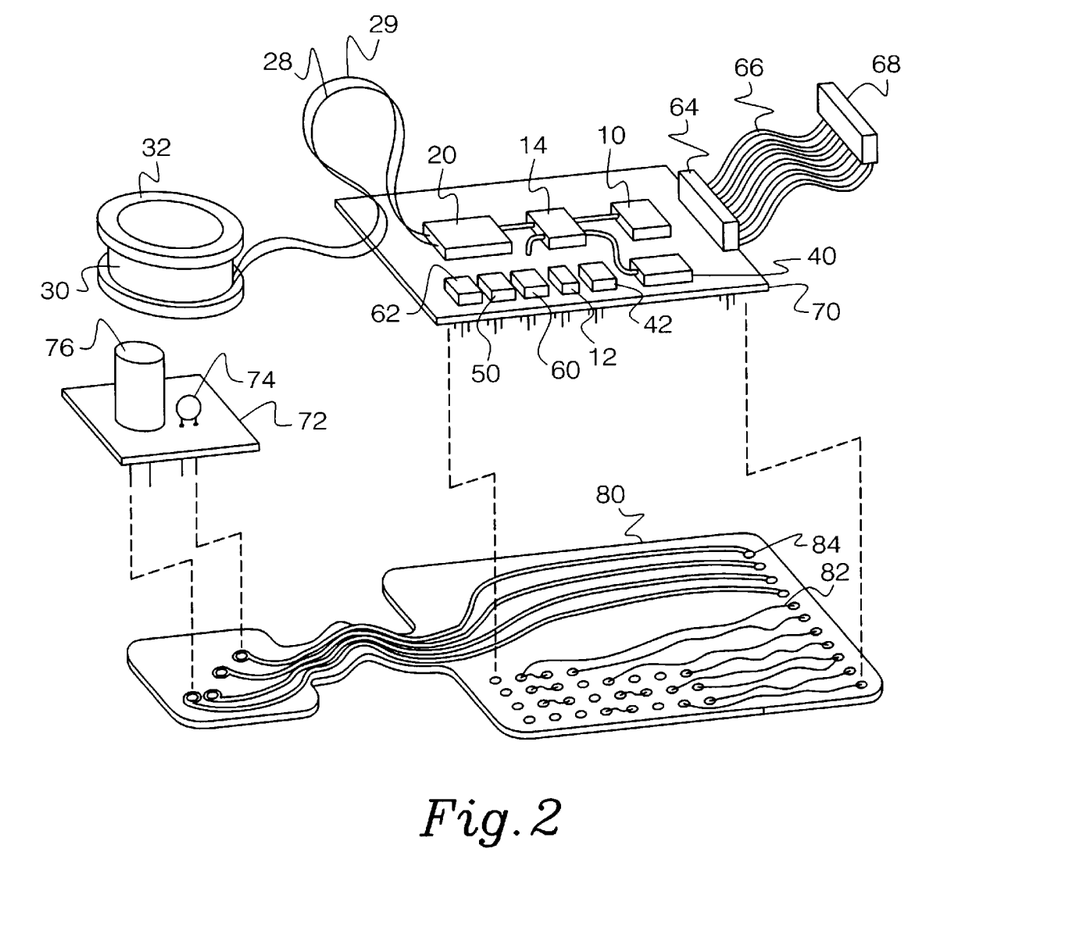
FIG. 2 is a blow-up perspective view of the various components of a fiberoptic gyroscope of the present invention.

In FIG. 2 is a blowup perspective of the various components that may be used in a single axis fiberoptics gyroscope. In this view we can see a fiberoptic coil 30 being wound on a typical core or bobbin 32 which may be metal, plastic or other suitable material in order to hold the multiple layers of the fiberoptic cable wrapped into a coil to form the sensor. In this particular embodiment, multiple electrical components and the optical components are fitted on a single board 70. As was described in FIG. 1, the integrated optical chip 20 has the interconnection of both sides of the fiberoptic coil 30 with loose portion of the interconnection fiberoptic cables 28 and 29 being shown. The optical connection between the integrated optics chip and the beam splitter 14 and the light source 10 are shown in schematic. The detector is shown as item 40. The temperature and current controller 12 for the light source 10, the preamplifier 42, the signal processor 50, the bias modulator and the summer 62 are shown as electrical components on board 70. Board 70 can be merely a support as will be described below or it in itself can be an electrical printed circuit wiring board.

In building a fiberoptics gyroscope into an inertial navigation system, typically an accelerometer 76 is used for each axis of the fiberoptics gyroscope. A temperature sensor 74 typically is also used to control and feed signals to the temperature and current controller 12. In the particular embodiment shown these are mounted on a separate support board 72. Again this may be a printed wiring board or it may be simply a mechanical support. Board 72 is typically mechanically joined to the bobbin 32 of the fiberoptic coil. A flexible support 80 interconnects the board 70 and the board 72. In the embodiment shown, flexible member 80 is a mylar, kevlar or other suitable insulator having copper traces 82 etched on the surface with solder pads 84 for interconnecting the various electrical components between the main board 70 and the sub-board 72.

These flexible plastic electrical wiring boards are typically produced by bonding sheet copper to the mylar, Teflon, or kevlar surface and then putting a photoresist on the surface and optically exposing the traces to remain, washing off the photoresist and then etching away the copper that is unwanted.

Board 72 need not be a separate board but can be a portion of the bobbin 32 with holes through one flange of the bottom for inserting the accelerometer 76 and the temperature sensor 74. The flexible wiring circuit 80 then can be soldered directly to the components and mechanically attached by riveting, bolting, stapling, gluing or other attachment means to the flange of the bobbin 32. Similarly, support 70 need not be a printed wiring board but may have through holes for the leads of the various electrical components and the flexible printed circuit 80 may be soldered directly to the electrical components and then mechanically attached to the support board 70.

It should be noted that it is not necessary to have electrical interconnections on the flexible interconnection member 80. The flexible member 80 may be merely a flexible interconnect between the rigid board 70 and the fiberoptic coil 30. This flexible member then only supplies the flexible connection between the coil 30 and the rigid member 70 and provides a mechanical support to protect fiberoptic cables 28 and 29 but mechanically attaching cables 28 and 29 to the flexible support Also provided on board 70 is an electrical connection to other circuits including a header type connector 64 attached to the board, flexible cable 66 such as a ribbon cable or printed wiring flexible connector similar to flexible component 80 or may be a portion of flexible member 80, and a header type connector 68 for attaching to external circuitry and devices.

Figure 3:
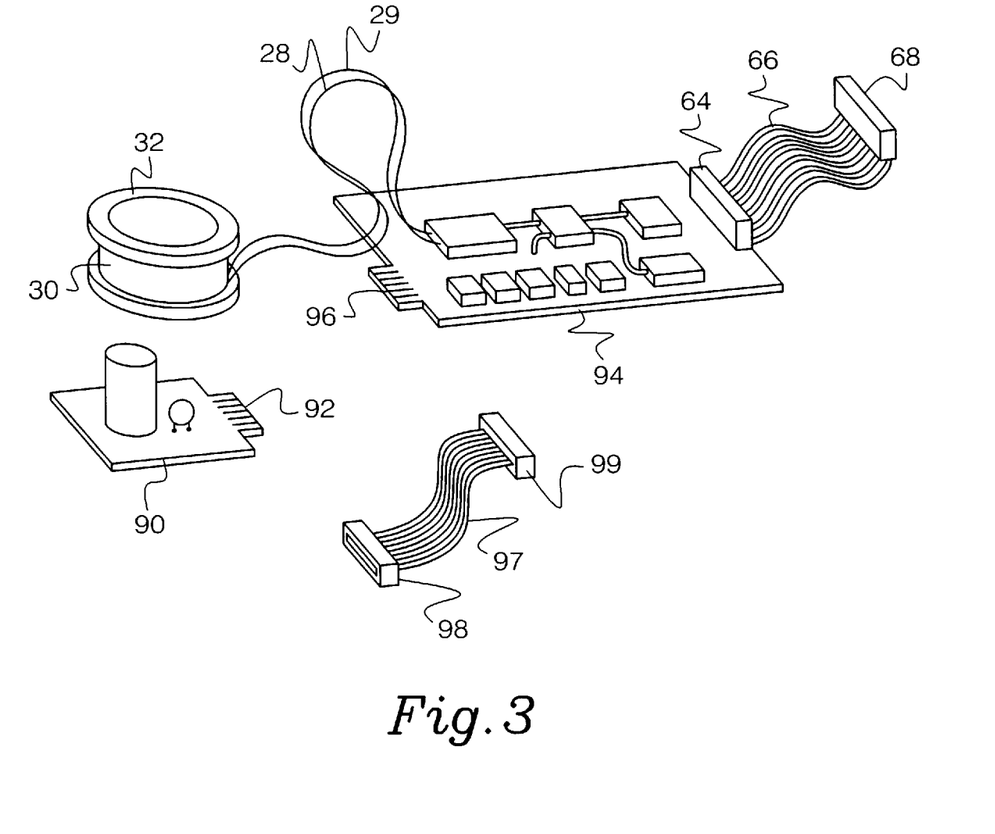
FIG. 3 is a blow-up perspective view of the various components of an alternate embodiment of a fiberoptic gyroscope of the present invention.

As an alternative embodiment of the flexible attachment of FIG. 2, in FIG. 3 is shown an alternate construction. Again the fiberoptics coil 30 wound on bobbin 32 and interconnecting by fiberoptic cables 28 and 29 to a board 94. In this particular embodiment, board 94 is a printed wiring board with an edge connector 96. Similarly, the accelerometer and the temperature sensor are on another printed wiring board 90 having an edge connector 92. A header 98 designed to connect to interconnect 92 and a second header 99 meant to interconnect to header 96 has a flexible cable 97 therebetween. As was shown in FIG. 2, a connector 64 with flexible cable 66 and a connector for external devices 68 is shown.

Figure 4:
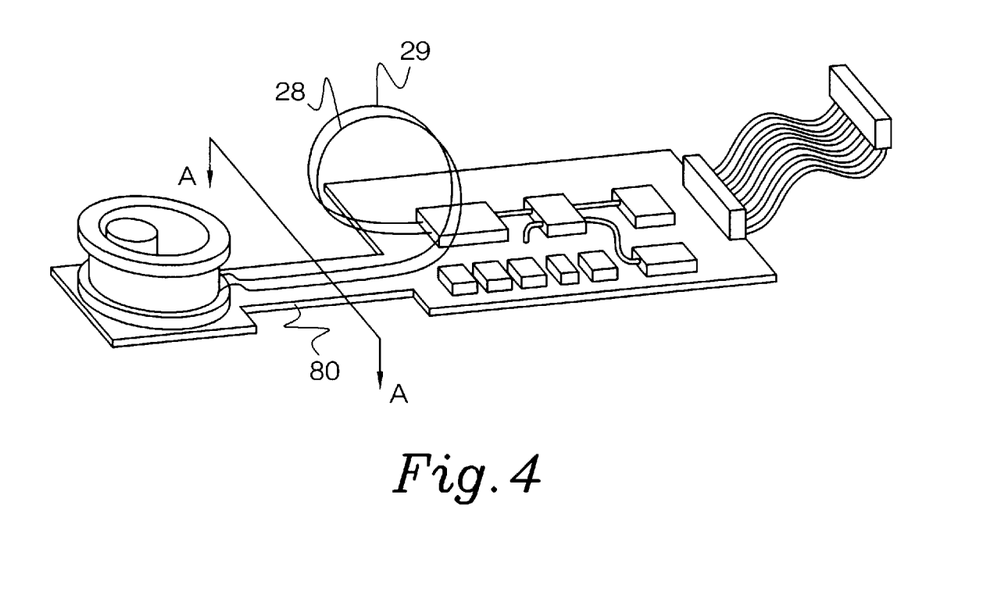
FIG. 4 is a perspective view of a first embodiment of the fiberoptic gyroscope assembly of the present invention.

FIG. 4 shows all the components previously shown in FIG. 2 put together in an assembly. As will noted the fiberoptic cables 28 and 29 now are attached to the flexible substrate to protect it mechanically from any handling problems.

Figure 5:
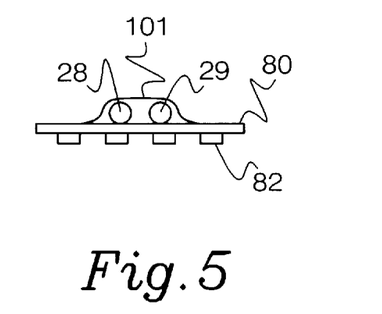
FIG. 5 is a sectional view along section AA of FIG. 4 showing a first embodiment of attaching fiberoptic cables to a flexible substrate.

FIG. 5 shows one method of attaching the fiberoptic cables 28 and 29 to the flexible substrate 80. In this particular embodiment the fiberoptic cables 28 and 29 are attached to the flexible substrate 80 by means of a flexible sealant or adhesive 101. This sealant or adhesive can be a silicone compound, a rubber type cement, or any other suitable, flexible adhesive that is compatible with the fiberoptics cable. It will be noted that the electrical traces 82 of the flexible connector 80 are on the opposite side of the plastic substrate from the fiberoptics cables 28 and 29. Although this is a preferred embodiment the traces may be on either side of the flexible substrate 80.

Figure 6:
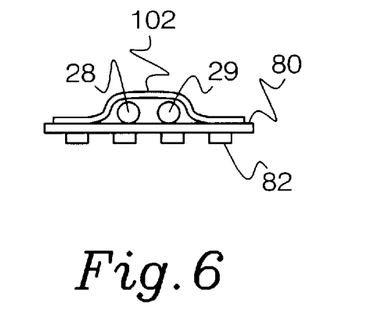
FIG. 6 is a sectional view along section AA of FIG. 4 showing an alternate embodiment of attaching fiberoptic cables to a flexible substrate.

Referring now to FIG. 6, an alternate mechanical attachment method is shown. In this embodiment, a tape is used to attach the fiberoptic cables 28 and 29 to the flexible substrate 80. Anyone skilled in the art can see that any mechanical means for joining the fiberoptic cable to the flexible substrate so that the interconnection is in itself flexible, would be suitable for this intended purpose.

Figure 7:
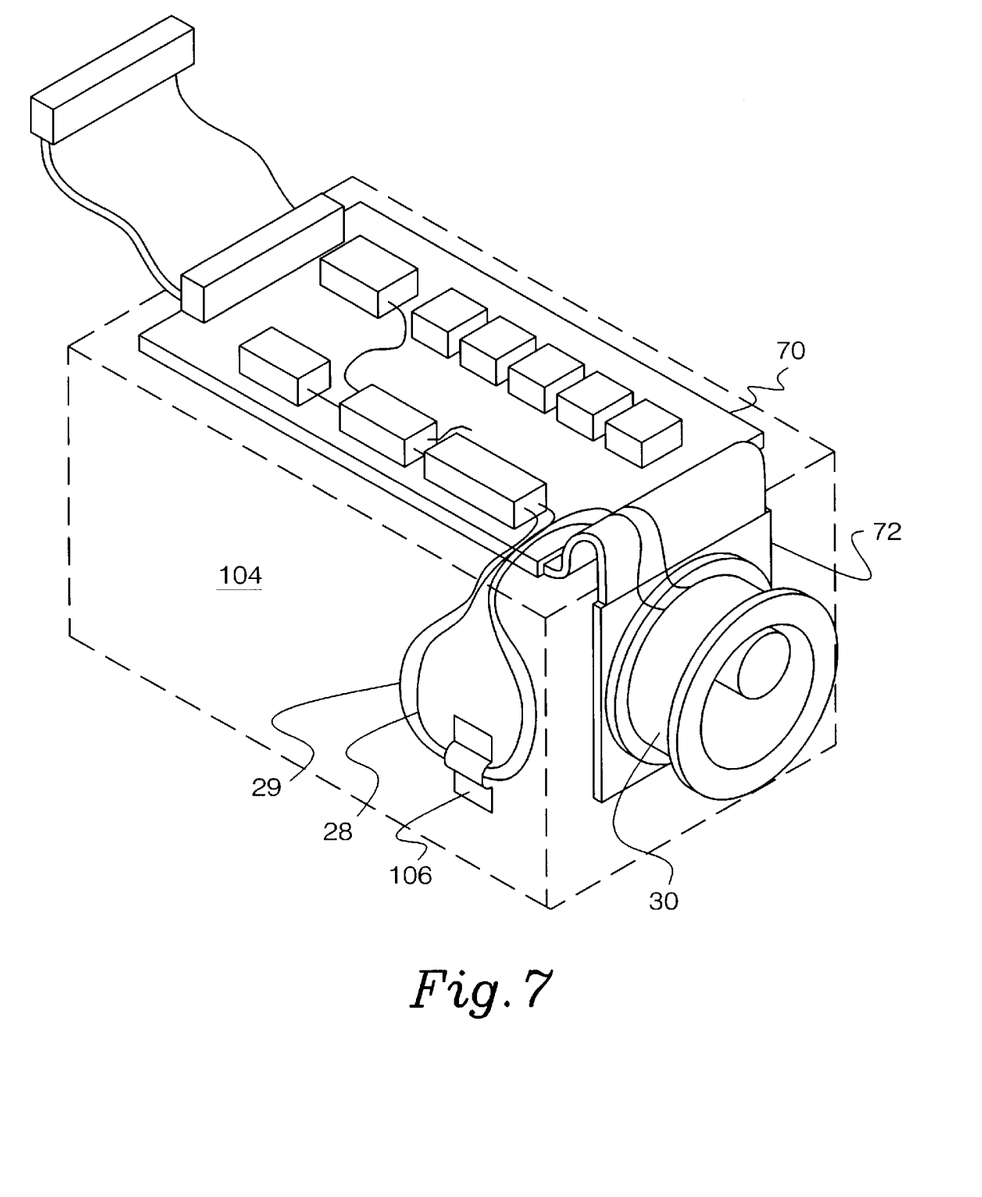
FIG. 7 is a perspective view showing a single axis fiberoptic gyroscope assembly of FIG. 4 attached to a mounting structure.

FIG. 7 shows a fully assembled single-axis fiberoptics gyro of the present invention mounted on a mounting structure. In this particular embodiment, the electronics and fiberoptics circuitry on board 70 are mounted on top of the mounting structure 104 while the fiberoptic coil with its mounting structure 72 is mounted on the face of the mounting structure 104. The loose portions of the fiberoptic cables 28 and 29 interconnecting the fiberoptic coil 30 and the component board 70 is attached to the side of the mounting support 104 by suitable means 106. This means could be an adhesive, a tape, a bracket with an attachment screw, or any other means to prevent the fiberoptic cables 28 and 29 from being mechanically abraded or subject to vibrations or other mechanical effects.

Figure 8:
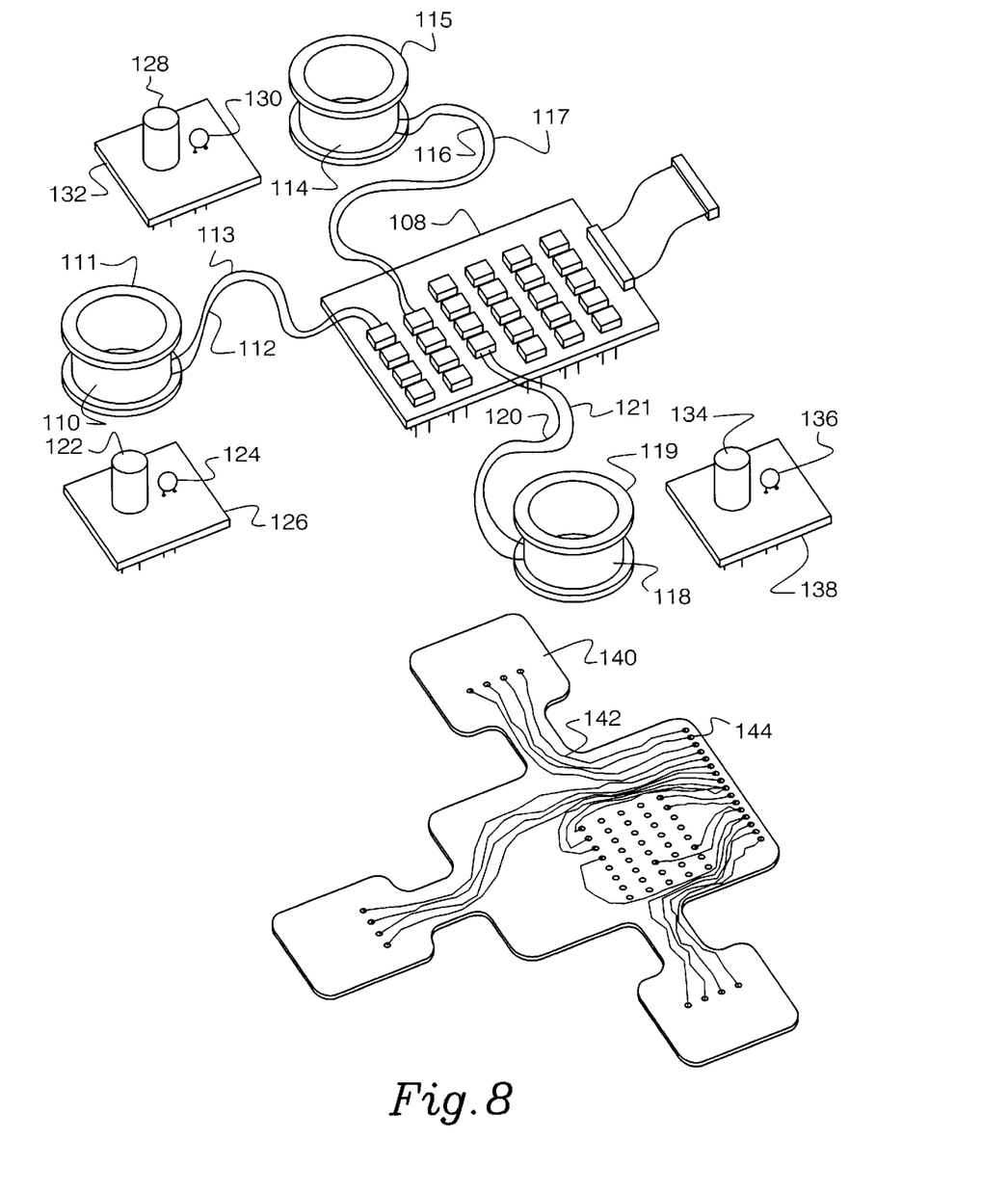
FIG. 8 is a blow-up perspective view of the various components of a three-axis fiberoptic gyroscope assembly.

Referring now to FIG. 8, a three-axis fiberoptic gyroscope is shown. In this embodiment a single printed circuit board 108 contains all of the major electronics and optical components of each of the three axis of the three-axis fiberoptic gyroscope. As is known in the art, a single light source or electromagnetic source can be used to power all three coils or a single light source may be used for each one of the coils. This is not important in explaining the significance of this invention and is merely a design choice. In this particular embodiment, a first-axis coil 110 is wound about a core or bobbin 111 and interconnected to the integrated optics chip through fiberoptics cables 112 and 113. Associated with this first-axis sensor is an accelerometer 122 and a temperature sensor 124 mounted on a sub-board 126. A second axis rotational sensor coil 114 wound on bobbin 115 is interconnected by fiberoptic cables 116 and 117 to its appropriate integrated optics chip. Associated with coil 114 is an accelerometer 128 and a temperature sensor 130 mounted on a sub-board 132. The third axis fiberoptics coil 118 being wound on its individual core or bobbin 119 and interconnected by fiberoptic cables 120 and 121 to an appropriate integrated optics chip has associated with it an accelerometer 134 and a temperature sensor 136 mounted on sub-board 138. A single flexible printed wiring board 140 having traces 142 and solder pads 144 is suitably arranged for interconnection of all these subassemblies.

Figure 9:
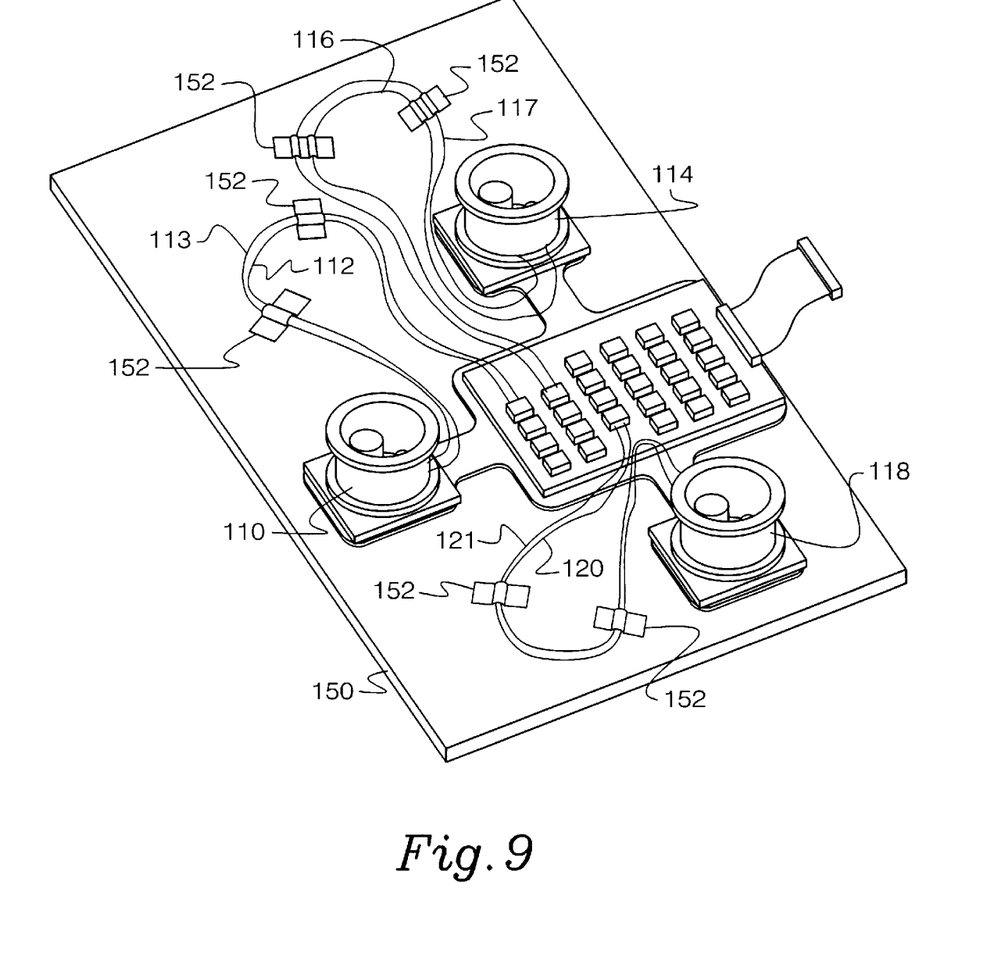
FIG. 9 shows a perspective view of an assembled three axis fiberoptic gyroscope assembly of FIG. 8 mounted on a fixture for testing.

FIG. 9 shows the assembly of all the components in FIG. 8 mounted on a test fixture 150. As is noted, fiberoptic cables 120 and 121 are restrained by appropriate restraints 152, which as has been mentioned before can be adhesive or similar devices. For the test fixture these restraints 152 are meant to be temporary in nature. In the particular embodiment of FIG. 9, all the components are laid out in a single axis which makes testing much simpler and greatly automated. Each of the other subsequent fiberoptics cables 112, 113, 116 and 117 are similarly restrained by temporary restraining devices 152. In this manner all of the components can be tested together in a single axis without the necessity of having a three-axis rate table.

Figure 10:
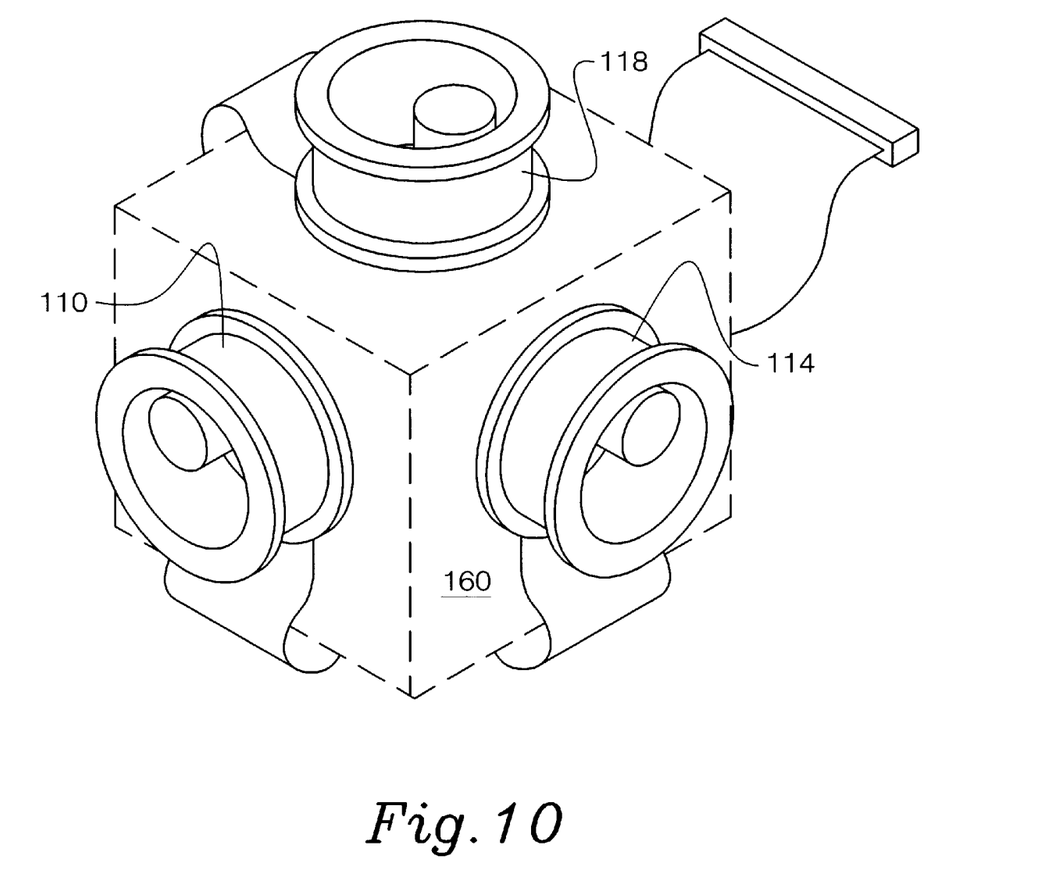
FIG. 10 is a perspective view of a three-axis fiberoptic gyroscope assembly attached to a mounting structure.

FIG. 10 shows a support 160 holding all of the three-axis of the fiberoptics coils 110 for the first axis, 114 for the second axis, and 118 for the third axis. As can be seen, a rate sensor in each one of the individual axis and an associated accelerometer is shown. In this manner a complete inertial reference system can be developed.

In summary, the present invention, in accordance with its various aspects and embodiments, provides an improved method for manufacturing a fiberoptic gyroscope and a fiberoptic gyroscope produced thereby. The modular nature of the fiberoptic gyro assemblies, which are enabled in accordance with the present invention, can be used to readily form multi-axis fiberoptic rotation rate sensors. The design of the present invention enables rework or replacement of components or entire assemblies in multi-axis sensor designs and is readily adaptable to high-volume, low-cost automated manufacturing procedures.

The present invention has been described above with reference to various preferred exemplary embodiments.

However, those skilled in the art will recognize that changes and modifications may be made to the preferred embodiments without departing from the scope of the present invention. For example, the present invention is not limited to the specific support structures or configurations shown herein. In addition, various improvements in and modifications of the fiberoptic components used in connection with the assemblies herein may be made as are now known and hereafter devised by those skilled in the art. These and other changes and modifications are intended to be included within the scope of the present invention as set forth in the following claims.

The embodiments of an invention in which an exclusive property or right is claimed are defined as follows:

1. A fiberoptic gyroscope device to detect rotational angular velocity about at least one axis of rotation comprising:
    at least one fiberoptic coil attached to a flexible member;
    said fiberoptic coil having a first and a second fiberoptic cable extending therefrom;
    said flexible member attached to a rigid member;
    said rigid member having electronic and optical components attached thereto;
    said first and said second fiberoptic cable attached to said optical components; and
    said first and said second fiberoptic cable attached to and protected by said flexible member.

2. A fiberoptic gyroscope device of the type configured to detect rotational angular velocity about at least one axis, the device comprising:
    at least one fiberoptic coil configured to detect rotational angular velocity about one axis, said at least one fiberoptic coil having a pair of fiberoptic leads;
    a substantially rigid member comprising suitable fiberoptic components and signal processing circuitry to enable operation of the device, said fiberoptic components being optically coupled to said pair of fiberoptic leads; and
    a flexible connector mechanically connected to said fiberoptic coil and to said rigid member to connect said coil to said rigid member.

3. The device of claim 2, further comprising a fiberoptic storage assembly associated with said fiberoptic coil and other optic components and interconnected therewith by said flexible connector.

4. The device of claim 2, comprising two or more fiberoptic coils, each of said coils being connected to said rigid member by said flexible connector.

5. The device of claim 4, further comprising a support housing configured to enable orientation of said coils about two or more different axis.

6. The device of claim 5, wherein said fiberoptical components include a single electromagnetic source, said electomagnetic source configured for association with each of said fiberoptic coils.

7. A method of fabricating a fiberoptic gyroscope comprising the steps of:
    providing a rigid member for attachment of electronic and optical components;
    providing a fiberoptic coil having multiple layers of fiberoptic cable wound thereon, said fiberoptic coil having a first and a second fiberoptic cable extending therefrom;
    providing a flexible member to interconnect said rigid member and said fiberoptic cable; and
    mechanically attaching said first and said second fiberoptic cable to said flexible member.

8. A method of fabricating a fiberoptic gyroscope comprising the steps of:
    providing a printed wiring board configured for attachment of fiberoptic components and signal processing circuitry to enable operation of the fiberoptic gyroscope to detect rotational angular velocity about at least one axis;
    proving at least one fiberoptic coil, said at least one fiberoptic coil having a pair of ends coupled to said printed wiring board; and
    mechanically coupling said at least one fiberoptic coil to said printed wiring board through use of a flexible connector.

* * * * *